United States Patent [19]

Cain et al.

[11] Patent Number: 5,342,644
[45] Date of Patent: Aug. 30, 1994

[54] PRODUCTION OF TEMPERED CONFECTIONERY

[75] Inventors: Frederick W. Cain, Voorburg, Netherlands; Dryck J. Cebula, Bedford; Neil G. Hargreaves, Billericay, both of Great Britain

[73] Assignee: Van den Bergh Foods Co., Division of Conopco, Inc., Lisle, Ill.

[21] Appl. No.: 907,093

[22] Filed: Jul. 1, 1992

[30] Foreign Application Priority Data

Jul. 3, 1991 [EP] European Pat. Off. ........ 91306028.1

[51] Int. Cl.$^5$ .............................................. A23G 1/00
[52] U.S. Cl. ................... 426/660; 426/613; 426/601
[58] Field of Search ................ 426/631, 601, 613, 660

[56] References Cited

U.S. PATENT DOCUMENTS

| | | | |
|---|---|---|---|
| 4,865,856 | 9/1989 | Groen | 426/660 |
| 4,877,636 | 10/1989 | Koyano et al. | 426/607 |
| 4,888,196 | 12/1989 | Ehrman et al. | 426/660 |
| 4,910,037 | 3/1990 | Sagi et al. | 426/601 |
| 5,023,101 | 6/1991 | Sugihara et al. | 426/603 |
| 5,023,106 | 6/1991 | Ehrman et al. | 426/660 |
| 5,032,418 | 7/1991 | Sollich | 426/660 |
| 5,188,853 | 2/1993 | Sollich | 426/660 |

FOREIGN PATENT DOCUMENTS 2242639 9/1990 Japan.

OTHER PUBLICATIONS

Yasuda, Atsushi et al. "The Behavior of Triglycerides Under High Pressure: The High Pressure can Stably Crystallize Cocoa Butter in Chocolate", High Pressure and Biotechnology Journal, vol. 224, (1992) pp. 255–259.

*Primary Examiner*—Jeanette Hunter
*Attorney, Agent, or Firm*—Rimma Mitelman

[57] ABSTRACT

A continuous tempering process for the production of tempered confectionery is described. For this purpose, addition of external seeds as a slurry of seeds in liquid fat is performed. This continuous process must be carried out in such a way that the concentration of seeds (F) and the concentration of fat ($f_2$), both in the final product, are controlled by the fat level ($f_1$) in the starting material and the concentration of seeds in the slurry (S). Therefor, the process parameters should behave in accordance with specific equations within defined ranges for the different parameters.

10 Claims, 1 Drawing Sheet

PRODUCTION OF TEMPERED CONFECTIONERY

In order to produce chocolate products that contain cocoa butter and/or cocoa butter equivalents (=CBE's) displaying a proper contraction on solidification, a good gloss and an acceptable bloom-resistant shelf-life, it is necessary to temper the fat compositions used in the production of chocolate. In addition, fats that require tempering are often used in filling compositions.

Tempering, however, is a process that is extremely delicate and therefore difficult to control. Traditionally, tempering is performed as a batch process. Batch processes, however, have the disadvantage of being slow, time-consuming and producing a quantity of chocolate ready for use all at once. More sophisticated techniques therefore apply continuous, automatically controlled processes wherein seeds are generated in situ in the fat composition. Examples of these latter processes are disclosed in B. W. Minifie, Chocolate, Cocoa and Confectionery (3rd Ed.), 1989, pages 191–193. According to this process, the chocolate is conveyed through a temperer which is equipped with up to seven cooling zones and which operates fully automatically. However, the use of seven cooling zones makes the process complicated and consequently less attractive for application on an industrial scale.

Therefore, there has been a long-existing need to come to a less complicated process that could be applied on an industrial scale. The first approach to achieve this was the use of external crystals that could be added to the molten chocolate mass. Examples of these processes can be found in JP 02/242 639; EP 321 227; EP 294 974 or EP 276 548.

For instance, JP 02/242 639 discloses a process wherein a dispersion containing fat crystals in liquid oil is used in order to overcome the problems relating to the conventional tempering processes. In this process a dispersion of fat crystals in liquid oil, wherein the crystal concentration is 3–50 wt. %, is compounded with liquid chocolate so that the crystal concentration in the chocolate is 0.005–10 wt. %, whereupon the mixture is cooled. From the specification (cf., e.g., page 8, last paragraph—page 9, first paragraph of the English translation of this Japanese document) it can be concluded that the process is carried out as a batch process, as only amounts of added slurry are mentioned whereas throughputs of the slurry are not given.

According to EP 321 227 the tempering operation in the preparation of hard butter can be eliminated by adding a shortening (i.e. a liquid fat containing crystals) to the hard butter. The shortening is added in the cooling and solidifying step of a molten mixture of hard butter ingredients at a temperature lower than that is needed for completely melting the mixture. According to the processes described in the examples, again batch processes were performed. Similar processes are described in EP 294 974 and EP 276 548.

The above-mentioned processes, however, do not overcome all the problems associated with the tempering in a satisfactory manner. A good summary of the problems associated with tempering is found in the articles of E. S. Seguine, The Manufacturing Confectioner, May 1991, page 117 et seq. and D. J. Cebula et al., ibid, page 131 et seq. In these articles the problems related to batch processing, continuous processing, complexity, control, non-equilibrium (thermodynamic) state, viscosity control etc. are discused.

Therefore, we have conducted an investigation on how to perform an external tempering operation in a continuous way. This investigation led to our invention, i.e. a process for the production of tempered confectionery by external addition of seeds, which is characterized by a continuous addition of seeds as a slurry wherein a throughput W of a fat slurry containing fat seeds is continuously mixed with a liquid confectionery composition, whereupon the mixture is worked continuously, in which process the concentration of seeds (F) and the concentration of fat ($f_2$), both in the final product, are controlled by the fat level ($f_1$) in the starting confectionery composition and the concentration of seeds (S) in the fat slurry in such a way that W; F; $f_1$; $W_1$; $f_2$; $W_2$ and S behave according to the following equations:

$$F = \frac{S(f_2 W_2 - f_1 W_1)}{f_2 W_2} \quad \text{and} \quad W = (f_2 W_2 - f_1 W_1)$$

wherein:
- $0.005 < F < 0.20$
- $f_1 > 0.26$
- $f_2 < 0.70$
- $0.01 < S < 0.60$ wherein:
- $f_1$=weight fraction of fat in starting material;
- $W_1$=throughput of starting material (weight units/time unit);
- $f_2$=weight fraction of fat in final product;
- $W_2$=throughput of final product (weight units/time unit);
- S=weight fraction of seeds in the slurry;
- F=weight fraction of seeds in fat phase of final product;
- W=throughput of slurry added (weight units/time unit).

According to this process, the weight fraction ($f_2$) of the fat in the final product is kept below 0.70, while, simultaneously, the weight fraction of seeds (F) in the fat phase of the final product is kept between 0.005 and 0.20. This is achieved by regulating the throughput (W) of slurry that is added, dependent upon the weight fraction (S) of seeds in the slurry and the throughput ($W_1$) and the weight fraction ($f_1$) of fat in the starting material.

In this way, a process is obtained by which a continuous slurry seeding results in a tempered product with good product properties. When the criteria mentioned above are satisfied, both under-tempering and over-tempering of the confectionery products can be avoided. The best results for the production of tempered chocolate are obtained when F, $f_1$; $f_2$ and S are kept within the following ranges: $0.1 < F < 0.15$; $f_1 > 0.28$; $f_2 < 0.35$ and $0.015 < S < 0.45$.

For the production of a tempered chocolate filling the criteria are best when $0.1 < F < 0.15$; $f_1 > 0.28$; $0.40 < f_2 < 0.60$ and $0.015 < S < 0.45$.

The seeds are preferably chosen from the class of fats high in SOS-type triglycerides, wherein S=saturated fatty acid with 16-24 carbon atoms and O=unsaturated fatty acid with at least 18 carbon atoms. In particular, S=$C_{16}$, $C_{18}$ or $C_{22}$ and O=oleic.

Preferred seeds are shea stearin triglycerides and enzymatically prepared BOB triglycerides (B=behenic). The seeds are present in a liquid fat component, preferably the same fat as is present in the confectionery composition, i.e. in general cocoa butter, although cocoa butter equivalents, such as palm oil mid-fractions, can also be used. The most preferred seeds have a melting point that is at least 2° C. higher than the melting point of the continuous fat phase of the dispersion (=slurry). In this way, a slurry that has the desired seed content can be easily prepared.

The slurries are normally prepared by adding seed crystals (size: 10–70 $\mu$m, $\beta$-stable) to melted fat at a temperature at which the seeds do not melt. During addition of the seeds, the temperature is kept at the pre-selected temperature while the seeds are dispersed in the molten fat by stirring the mixture most carefully.

Very good tempering can be obtained when the seeds have a mean size of 10–70 $\mu$m, in particular 15–40 $\mu$m, while the seeds consist of $\beta$-stable seed crystals.

BRIEF DESCRIPTION OF THE DRAWINGS

The Figure represents a flow sheet of the process.

The slurry is mixed with the molten composition at a strictly controlled temperature, using a medium-shear rate mixing device. A convenient way of performing this is by using a C-unit (as used in the manufacture of spreads), although an extruder could also be used.

Figure 1:
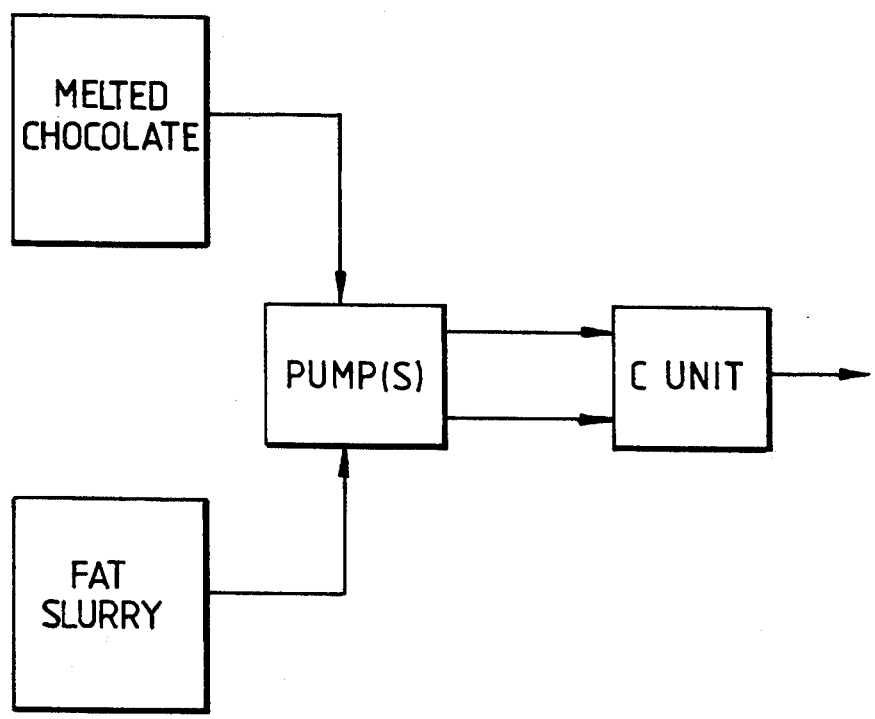

When a chocolate is prepared, the temperature of the liquid chocolate and the temperature of the slurry are preferably both 30°–40° C. When a filling is prepared, these temperature can even be 10°–40° C.

By carrying out our continuous process, we can limit the residence time of the composition in the system to 1–8 min.

The invention will now be described with reference to the attached schematic representation of a possible flow sheet. According to this flow sheet, dark chocolate is melted. $W_1$ weight units per time unit of the chocolate melt, with fat content $f_1$, are mixed with W weight units per time unit of the slurry in the pump. The temperature of both the seeds and the starting material is preferably 35° C. The mixture is pumped through a C-unit. The shaft speed thereof is about 100 rpm.; the temperature of the mixture at the exit of the C-unit is about 35° C. This mixture can be used for enrobing, depositing etc. in the usual way. Throughputs of more than 1 kg/h are appropriate. Preferred throughputs are about 3 kg/h.

The invention will now be illustrated by the following non-limiting Examples.

EXAMPLE I

Preparation of Crystal Slurry

Five slurries were prepared with 3.33%; 8.33%; 13.33%; 16.66% and 33.33% shea stearin crystals, respectively. Cocoa butter was melted and cooled to 35° C. Shea stearin crystals (20 $\mu$m; $\beta$-stable) were added and dispersed by stirring carefully and the temperature of the mixture was kept at 35° C.

Continuous Tempering Process

A standard micro-votator line consisting of premix tanks, proportioning pumps and mixer C-unit was used for these experiments.

Premix vessels were of approximately 5 litre capacity with the facility for stirring and temperature control. An MPL pump with two independently controllable constant displacement heads was used. One arm of the pump allowed throughputs of up to $\approx$18 g/min. of oil. A setting of 95% gave 48.5 g/min. for the chocolate pump. 1.5 g/min. was obtained by setting the pump to 14% of capacity for the seeds. A mixer C-unit was used (capacity approximately 100 g) with the lower port for chocolate inlet and the middle port for the seeds slurry injection. This unit was operated at the minimum setting of 500 rpm. Temperatures were monitored, using thermocouples at various points along the line. For a diagram of the apparatus see FIG. 1.

After 10 minutes, the seeds pump was started and the two streams mixed in the C-unit. After a suitable equilibration period, the 'tempered' chocolate was collected and assessed for its state of temper by Greer cooling curve evaluation. Any adjustments were then carried out and the system was left for a further period before being sampled again.

So, the following data for $W_1$, W, S, $f_1$ and F were used:
$W_1$ = 53.6 g/m;
W = 1.45 g/min.
S = 16.66% (or S = 0.1666)
$f_1$ = 32.5% (or $f_1$ = 0.325)
F = 1.5% (or F = 0.015).

After equilibration, the following conditions were applied:
Time: 14.20 minutes;
Temperature chocolate: 41° C.
Temperature seed slurry: 28.5° C.
Temperature tempered chocolate: 35.5° C.

The product obtained during the production time of 14.20 minutes was well-tempered.

We claim:

1. Process for the production of tempered confectionery by external addition of seeds, the process comprising continuously adding a slurry of fat seeds to a liquid confectionery composition, wherein a throughput W of the fat seed slurry is continuously mixed with a liquid confectionery composition to attain a mixture, and continuously working the mixture to attain the tempered confectionery, in which process the concentration of seeds (F) and the concentration of fat ($f_2$), both in the final product, are controlled by the fat level ($f_1$) in the starting confectionery composition and the concentration of seeds (S) in the fat slurry in such a way that W; F; $f_1$; $W_1$; $f_2$; $W_2$ and S behave according to the following equations:

$$F = \frac{S(f_2 W_2 - f_1 W_1)}{f_2 W_2} \quad \text{and} \quad W = (f_2 W_2 - f_1 W_1)$$

wherein:
0.005 < F < 0.20
$f_1$ > 0.26
$f_2$ > 0.70
0.01 < S < 0.60 wherein:
$f_1$ = weight fraction of fat in starting material;
$W_1$ = throughput of starting material (weight units/time unit);
$f_2$ = weight fraction of fat in final product;
$W_2$ = throughput of final product (weight units/time unit);
S = weight fraction of seeds in the slurry;
F = weight fraction of seeds in fat phase of final product;
W = throughput of slurry added (weight units/time unit).

2. Process for the production of tempered chocolate according to claim 1, wherein $0.1 < F < 0.15$, $f_1 > 0.28$, $f_2 < 0.35$ and $0.015 < S < 0.45$.

3. Process for the production of tempered chocolate filling according to claim 1, wherein $0.1 < F < 0.15$, $f_1 > 0.28$; $0.40 < f_2 < 0.60$ and $0.015 < S < 0.45$.

4. Process according to claim 1, wherein the seeds are fats high in SOS triglycerides, wherein S=saturated fatty acid with $C_{16}$–$C_{24}$ and O=unsaturated fatty acid with at least 18 carbon atoms.

5. Process according to claim 4, wherein the seeds are shea stearin triglycerides or enzymatically prepared BOB triglycerides (B=behenic).

6. Process according to claim 1, wherein the melting point of the seeds is at least 2° C. higher than the melting point of the continuous phase of the dispersion.

7. Process according to claim 1, wherein the temperature of the liquid chocolate and the temperature of the fat slurry are at least 30°–40° C.

8. Process according to claim 1, wherein the temperature of the liquid filling fat and the temperature of the fat slurry are 10°–40° C.

9. Process according to claim 1, wherein the seeds have a mean size of 10–70 μm and consist of β-stable seed crystals.

10. Process according to claim 1, wherein the residence time of the mixture in the system is 1–8 minutes.

* * * * *